B. FORD.
STORAGE BATTERY.
APPLICATION FILED MAY 19, 1915.

1,207,287.

Patented Dec. 5, 1916.
2 SHEETS—SHEET 1.

WITNESS:
Rob. W. Kitchel.

INVENTOR
Bruce Ford
BY
Augustus B. Stoughton,
ATTORNEY.

UNITED STATES PATENT OFFICE.

BRUCE FORD, OF PHILADELPHIA, PENNSYLVANIA.

STORAGE BATTERY.

1,207,287. Specification of Letters Patent. Patented Dec. 5, 1916.

Application filed May 19, 1915. Serial No. 29,028.

*To all whom it may concern:*

Be it known that I, BRUCE FORD, a citizen of the United States, residing at Philadelphia, in the county of Philadelphia and State of Pennsylvania, have invented certain new and useful Improvements in Storage Batteries, of which the following is a specification.

The principal object of the present invention is to provide storage batteries adapted for use upon boats or ships and in other locations where it is particularly desirable to guard against breakage of the jars or containers such as would permit of the escape of the electrolyte.

Another object of the invention is to provide for properly referring the weight of the plate structure to the outside part of the jar or container which is stronger and stiffer and better adapted to carry such weight than the inside part of the container which is prevented from receiving the weight or load of the plate structure.

Other objects of the invention will appear from the following description which will be made in connection with the accompanying drawings in which—

Figure 1:
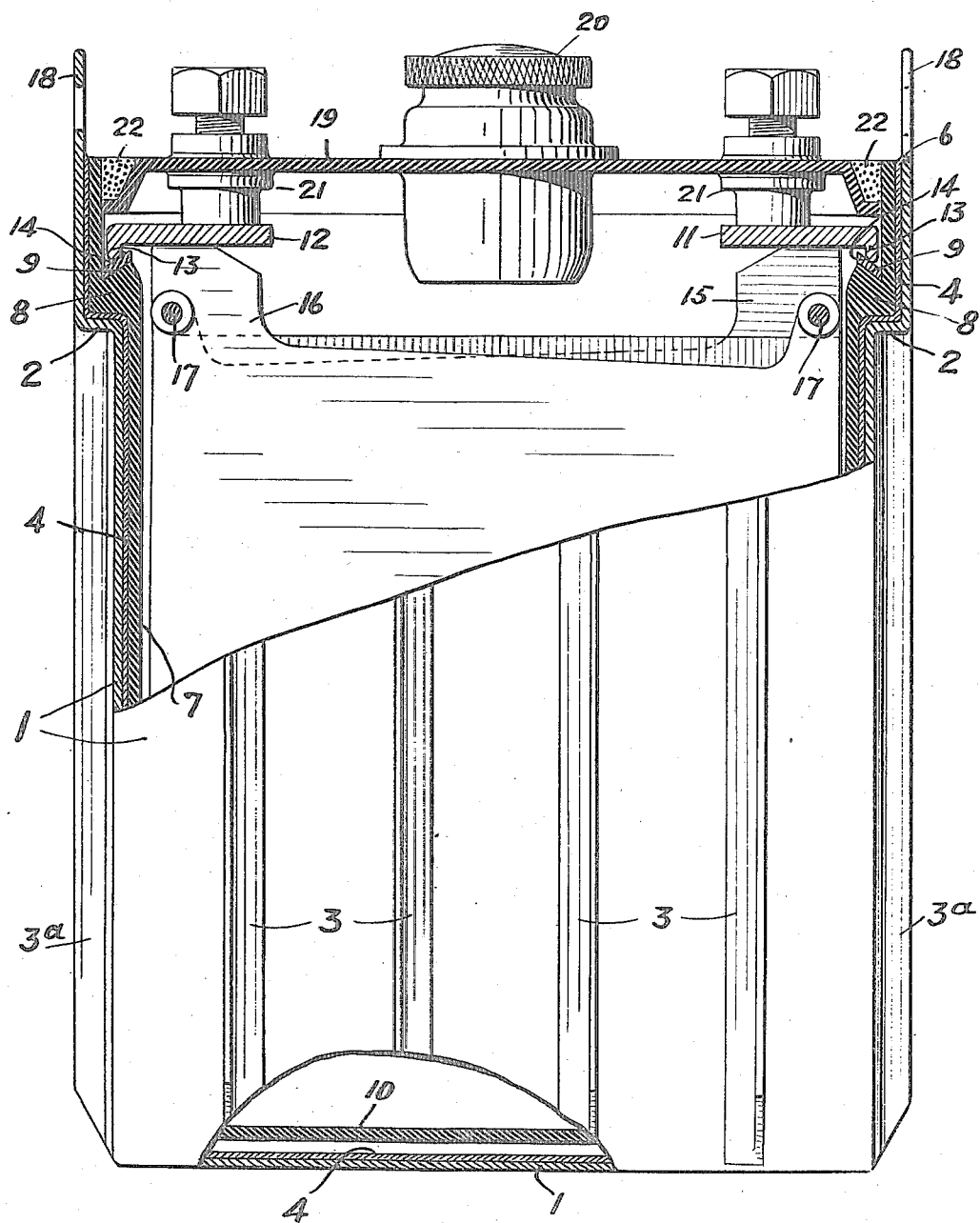
Figure 2:
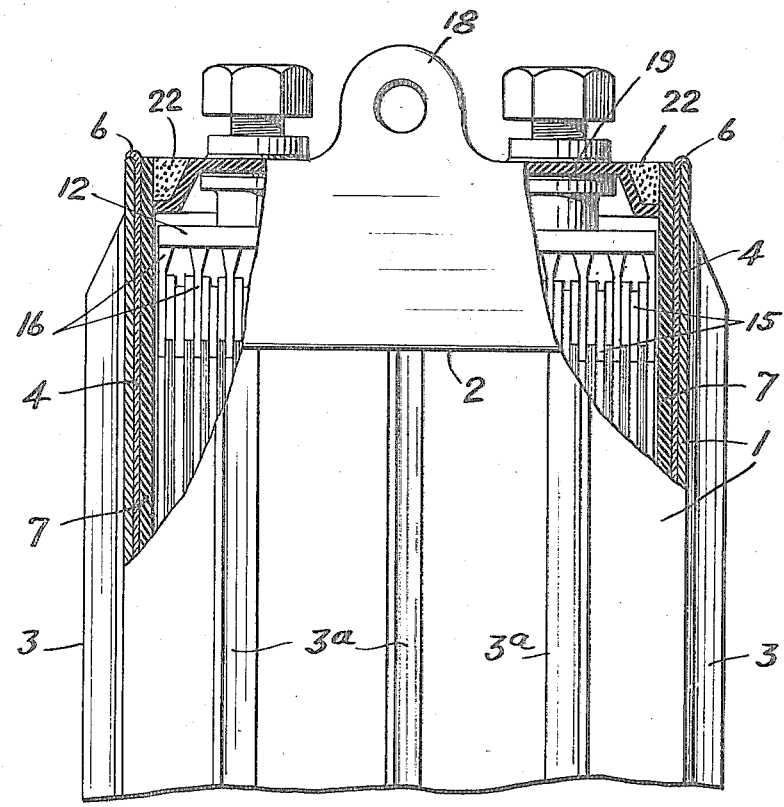
Figure 3:
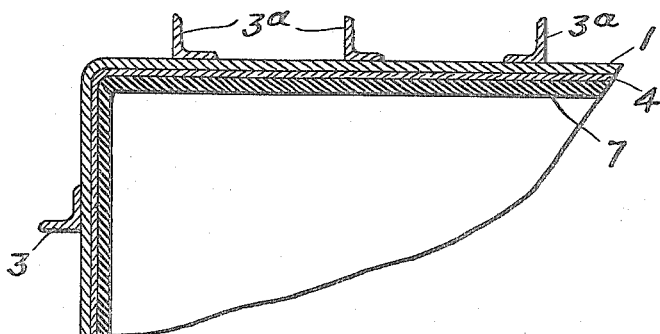

Figure 1, is a side view with parts broken away of a storage battery embodying or containing features of the invention. Fig. 2, is an end view with parts broken away of Fig. 1, and Fig. 3, is a sectional plan view.

In the drawings 1, is a metal container as of steel having an outward offset 2, in and near the top of two of its opposed side walls.

3, are ribs applied to this container 1, and they serve to stiffen and straighten it. Certain of these ribs 3ª, underlie the offsets 2, and serve to support them. The metal container when made of steel or like metal is provided with a leaden lining 4. This lining contacts with all parts of the interior face of the container and is folded over the top edge of the walls of the same as shown at 6. The leaden lining serves to protect the steel or like container from the corrosive action of sulfuric acid electrolyte.

7, is a rubber jar having offsets 8, similar and conforming to the offsets 2, of the container and provided on top thereof with an inclined seat 9. The jar of rubber or like material 7, stops short of the bottom of the container so that the bottom 10, of the jar is spaced above and clear of the bottom of the container, as shown in Fig. 1.

11 and 12, are bus bars and they are of course each of a different polarity. Feet 13, of these bus bars rest upon the inclined seats 9, or perhaps more accurately, upon soft rubber cushions or pads 14, applied thereto. All the plates of one polarity 15, are connected with the bus bar 11, and all the plates of the other polarity 16, are connected with the bus bar 12. 17, are rods that support the other ends of the plates.

The total weight of the plate structure is referred through the bus bars and offsets 8, to the offsets 2, and is borne by the metal container as distinguished from the rubber jar. The rubber jar may not take the weight of the plate structure because the space at the bottom between it and the jar prevents this even though the jar and container might expand unequally.

In speaking of the space between the bottom of the jar and the bottom of the container, I do not mean to preclude the use of a pad of some kind in that space for preventing the bottom of the rubber jar from unduly bulging, but the intention is to be sure that the weight of the plate structure is carried by the metal container and not by the rubber jar, and a compressible pad in this space would not prevent the accomplishment of this result.

The walls of the metal container in which the offsets 2, are formed are shown as extended upward in the form of ears 18, which are a convenient means for lifting and moving the assembled batteries.

19, is a cover provided with filling means 20, and carried by the plate structure through the intervention of the parts 21.

22, is a sealing compound for the cover.

The metal container, by reason of its strength, resists breakage under conditions which might break a rubber jar. If the rubber jar is broken the electrolyte cannot escape but is retained within the metal container, and the leaden lining of the latter protects the container from corrosion. The fact that the weight of the plate structure is carried by the metal container instead of the rubber jar is an important factor in preventing breakage of the rubber jar.

What I claim is:

1. In a storage battery the combination of a metal container having an outward offset in and near the top of two of its opposed side walls, a rubber jar stopping short of the bottom of the metal container and having offsets similar and conforming to the first mentioned offsets and provided on top thereof with seats, and a plate structure seated on the seats and of which the weight is carried by the outward offsets of the metal container.

2. In a storage battery the combination of a metal container having an outward offset in and near the top of two of its opposed side walls, a rubber jar stopping short of the bottom of the metal container and having offsets similar and conforming to the first mentioned offsets and provided on top thereof with seats, bus bars each of one polarity seated on the seats, and plates of like polarity connected to the bus bars whereby the weight of the plate structure is carried by the outward offsets of the metal container.

3. In a storage battery the combination of a metal container having an outward offset in and near the top of two of its opposed side walls, a rubber jar having offsets conforming to the first mentioned offsets, and a plate structure seated on said offsets and of which the weight is carried by the outward offsets of the metal container, substantially as described.

BRUCE FORD.

Witnesses:
WALTER G. HAWKINS.
A. M. NICHOLAS.